United States Patent
Kangas et al.

(10) Patent No.: US 8,054,869 B2
(45) Date of Patent: Nov. 8, 2011

(54) REDUCED COMPLEXITY FREQUENCY BAND AND VIRTUAL ANTENNA COMBINATION (VAC) SELECTION

(75) Inventors: Ari Kangas, Lidingö (SE); Markus Ringström, Stockholm (SE); Darlan Cavalcante Moreira, Fortaleza (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 675 days.

(21) Appl. No.: 12/174,829

(22) Filed: Jul. 17, 2008

(65) Prior Publication Data

US 2009/0238250 A1 Sep. 24, 2009

Related U.S. Application Data

(60) Provisional application No. 61/037,832, filed on Mar. 19, 2008.

(51) Int. Cl.
*H04B 1/38* (2006.01)
*H04L 5/16* (2006.01)

(52) U.S. Cl. .................................. 375/219; 375/267

(58) Field of Classification Search .................. 375/219, 375/267
See application file for complete search history.

(56) References Cited

U.S. PATENT DOCUMENTS
2007/0041464 A1* 2/2007 Kim et al. .................. 375/267

FOREIGN PATENT DOCUMENTS
WO 2007/024936 A2 3/2007
WO 2008/023811 A1 2/2008

* cited by examiner

*Primary Examiner* — David C. Payne
*Assistant Examiner* — Tanmay Shah
(74) *Attorney, Agent, or Firm* — Coats & Bennett, P.L.L.C.

(57) ABSTRACT

A downlink Channel Quality Indicator (CQI) is estimated in two steps. Initially, one or more subsets of received reference symbols are selected. If the transmitter may transmit signals in one or more of two or more frequency bands, optimal frequency bands are selected based on a first subset of reference symbols. If the transmitter may transmit using one of two or more VACs, an optimal VAC is selected based on the first or a second subset of reference symbols. An SINR is subsequently calculated for the selected frequency band and VAC combination, based on more than the subset(s) of reference symbols.

12 Claims, 5 Drawing Sheets

US 8,054,869 B2

REDUCED COMPLEXITY FREQUENCY BAND AND VIRTUAL ANTENNA COMBINATION (VAC) SELECTION

This application claims priority to U.S. provisional patent application Ser. No. 61/037,832, entitled "Reduced complexity band and virtual antenna combination (VAC) selection" filed Mar. 19, 2008, and incorporated herein by reference in its entirety.

FIELD OF THE INVENTION

The present invention relates generally to wireless communication networks, and in particular to a reduced complexity method of selecting a frequency band and virtual antenna combination.

BACKGROUND

Wireless communication systems are required to transmit ever-increasing amounts of data, in support of expanded subscriber services, such as messaging, e-mail, music and video streaming, and the like. Transmitting a higher volume of data over a given channel requires transmission at a higher data rate.

One known technique to improve data transmission rates in wireless communications is the use of multiple input, multiple output (MIMO) technology, wherein signals are transmitted from multiple transmit antennas and may be received by multiple receiver antennas. Using advanced coding and modulation schemes, two or more streams of data may be transmitted simultaneously to a receiver, increasing the data rate.

Maintaining high data rates in MIMO systems requires fast link adaptation. That is, the transmitter must constantly alter its selection of transmission parameters, such as the transmission frequency band and transmission antenna configuration, based on the current characteristics of the channel, which can change rapidly. In a Frequency Division Duplex (FDD) system, the instantaneous downlink channel conditions are not available at the base station; they must be determined by a receiver and communicated to the base station. In Wideband CDMA (WCDMA) and Long Term Extension (LTE), the instantaneous downlink channel conditions are communicated to the base station through a Channel Quality Indicator (CQI).

Estimating the CQI is a delicate task. Ideally, the channel quality should be estimated not only once, but for different potential frequency bands (if applicable) and for different potential Virtual Antenna Combinations (VAC) (if applicable). A virtual antenna consists of one or more antenna elements. These estimates are preferably performed for all potential combinations and at every Transmission Time Interval (TTI), in order to achieve maximum performance by selecting the optimal transmission parameters. This is necessary in order to determine the rank of the channel and which antennas to use for transmission, and also the optimal transmission frequencies. Furthermore, each estimate should be performed using all received reference (pilot) symbols, to ensure the highest quality channel estimates.

However, given the computational resources and power consumption constraints of mobile User Equipment (UE), it is virtually impossible to estimate the channel quality for all potential VACs and potential frequency bands for each TTI and at all reference symbol positions.

SUMMARY

According to one or more embodiments disclosed herein, the CQI estimation task is divided into two parts. Initially, one or more subsets of received reference symbols are selected. If the transmitter may transmit signals in one or more of two or more frequency bands, an optimal set of frequency bands (e.g., one or more) is selected based on the first subset of reference symbols. If the transmitter may transmit using one of two or more VACs, an optimal VAC is selected based on the first or a second subset of reference symbols. An SINR is subsequently calculated for the selected frequency bands and/or VAC based on more than the subset(s) of reference symbols.

DETAILED DESCRIPTION

Figure 1:
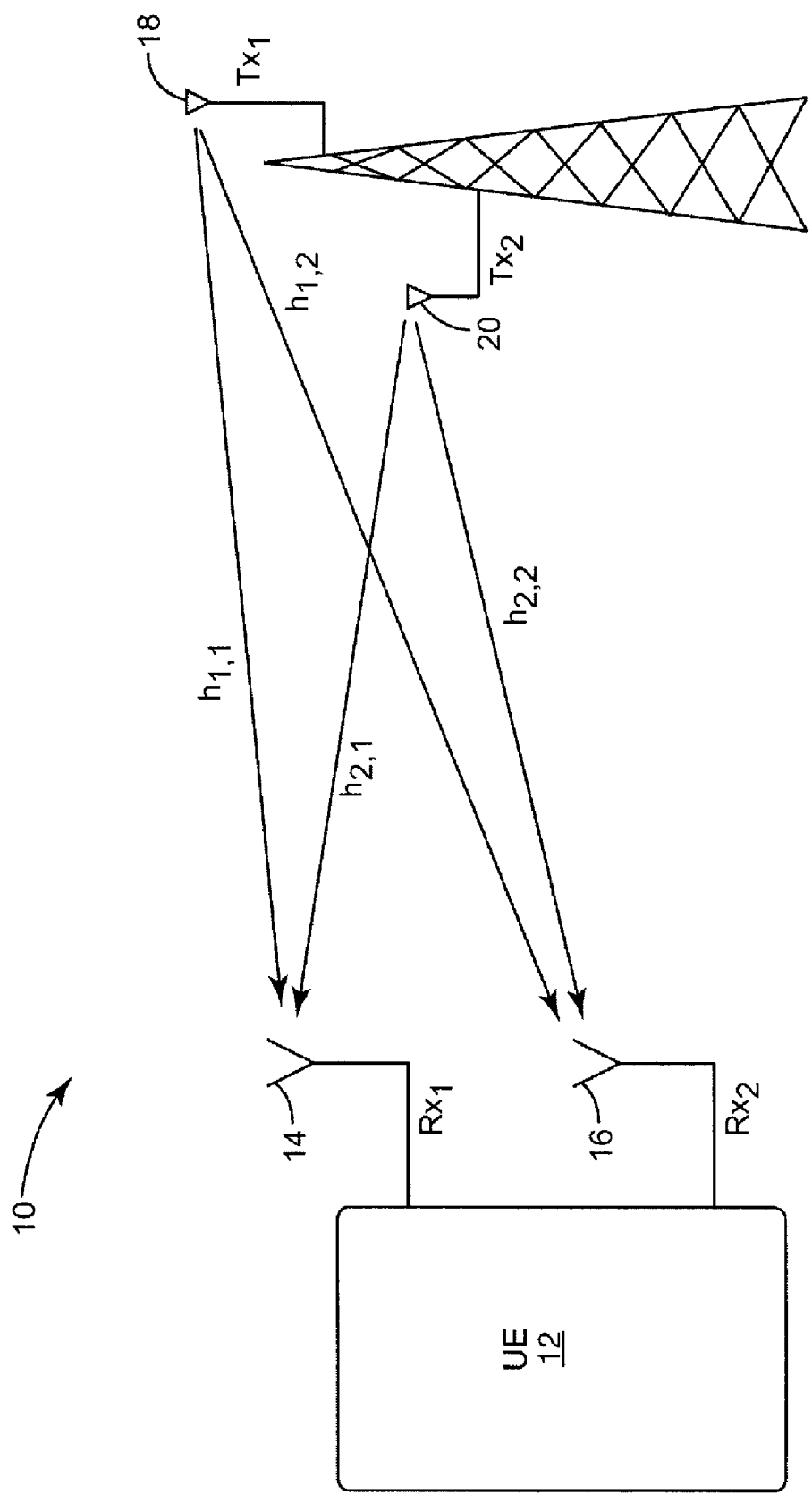
FIG. 1 is a diagram of downlink channels in a MIMO wireless communications network.

FIG. 1 depicts the downlink signal paths in a MIMO wireless communication network 10. A User Equipment (UE) 12, such as a mobile transceiver, receives signals on one or more receive antennas 14, 16. The signals are transmitted from one or more transmit antennas 18, 20. Each signal path experiences different channel conditions, which include impairment effects such as fading, interference, noise, and the like. In general, each channel is unique, as indicated. As known in the art, the transmit antennas 18, 20 transmit known reference symbols, also referred to as pilot symbols, at known positions within a data frame, to facilitate measurement of the channel conditions by the UE 12. Channel and noise estimates are thus available at the pilot positions.

Figure 2:
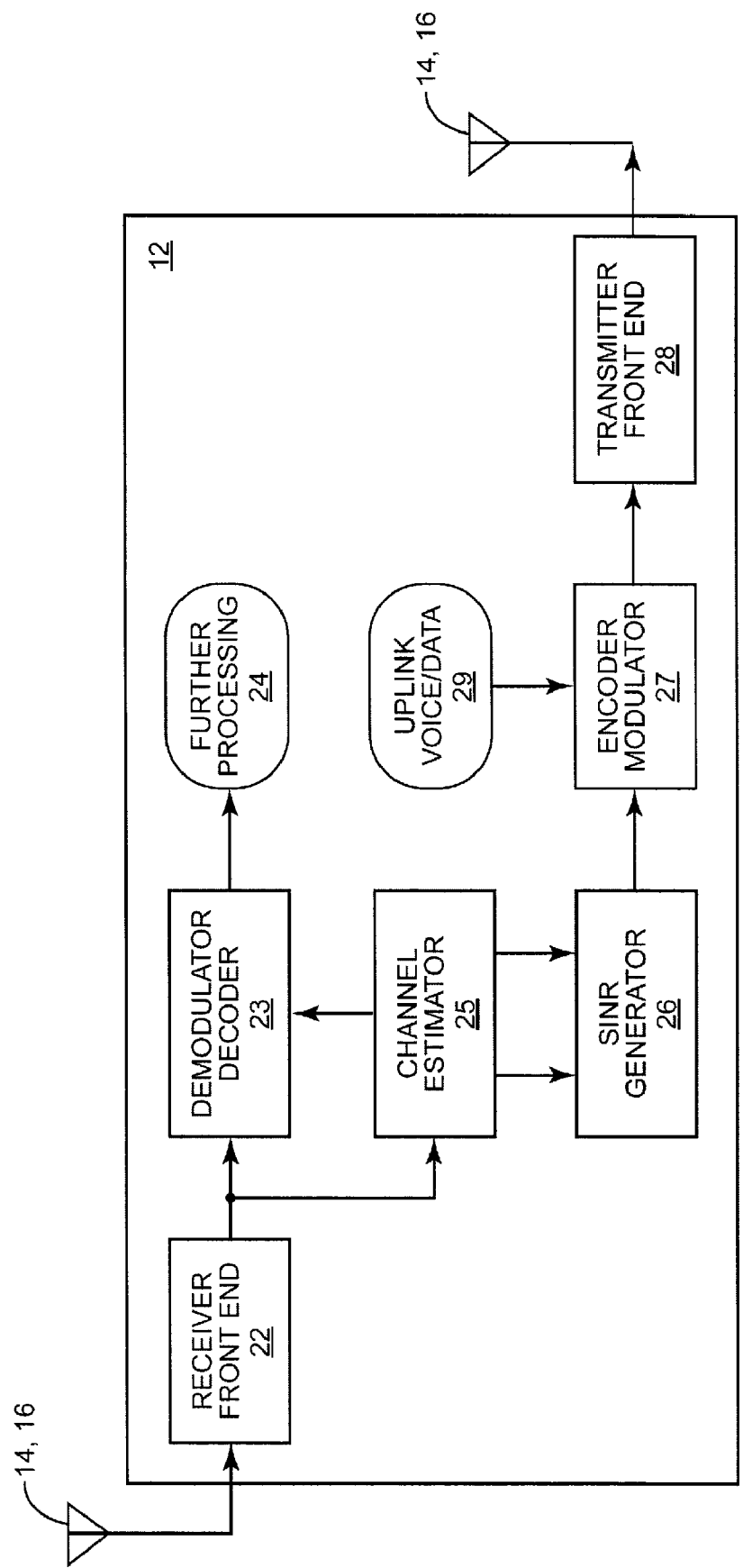
FIG. 2 is a functional block diagram of relevant portions of the wireless communication User Equipment (UE) of FIG. 1.

FIG. 2 depicts the SINR generation (and CQI estimation) and feedback path in the UE 12. Downlink signals are received at one or more receive antennas 14, 16, and are processed by receiver front-end circuits 22. Data symbols are demodulated and decoded at block 23, and are further processed, such as rendered into speech or audio, displayed as text or video, processed as commands, or the like, in various circuits in the UE 12, represented collectively by block 24. Reference symbols are provided by the receiver front-end circuits 22 to a channel estimation function 25. The channel estimator 25 generates channel, noise and interference estimates, and provides these to the demodulator and decoder function 23, so that it can detect the received data symbols. The channel estimator 25 additionally provides channel estimates to the SINR generator function 26, which estimates a SINR, and from that, a CQI for transmission to the base station for link adaptation. The CQI is provided to an encoder and modulator function 27, which also receives uplink data from various circuits in the UE 12, represented collectively by block 29. Encoded and modulated data are processed by a transmitter front-end 28 and other circuits, and modulated signals are transmitted to the base station on one or more antennas 14, 16.

As discussed above, ideally the channel quality is estimated, preferably over all received reference symbols, separately for each of a plurality of potential transmission frequency bands, each of a plurality of potential VACs, and all combinations thereof, every TTI. In reality, this is impractical. Accordingly, in one or more embodiments disclosed herein, the CQI estimation process is divided into two steps. Initially, only one or more subsets of the reference symbols are considered, to determine the most promising frequency bands and/or VAC. Subsequently, the channel quality for the selected frequency band and VAC is then estimated using more reference symbols to achieve a higher fidelity channel quality estimate for that frequency/VAC combination.

Figure 3:
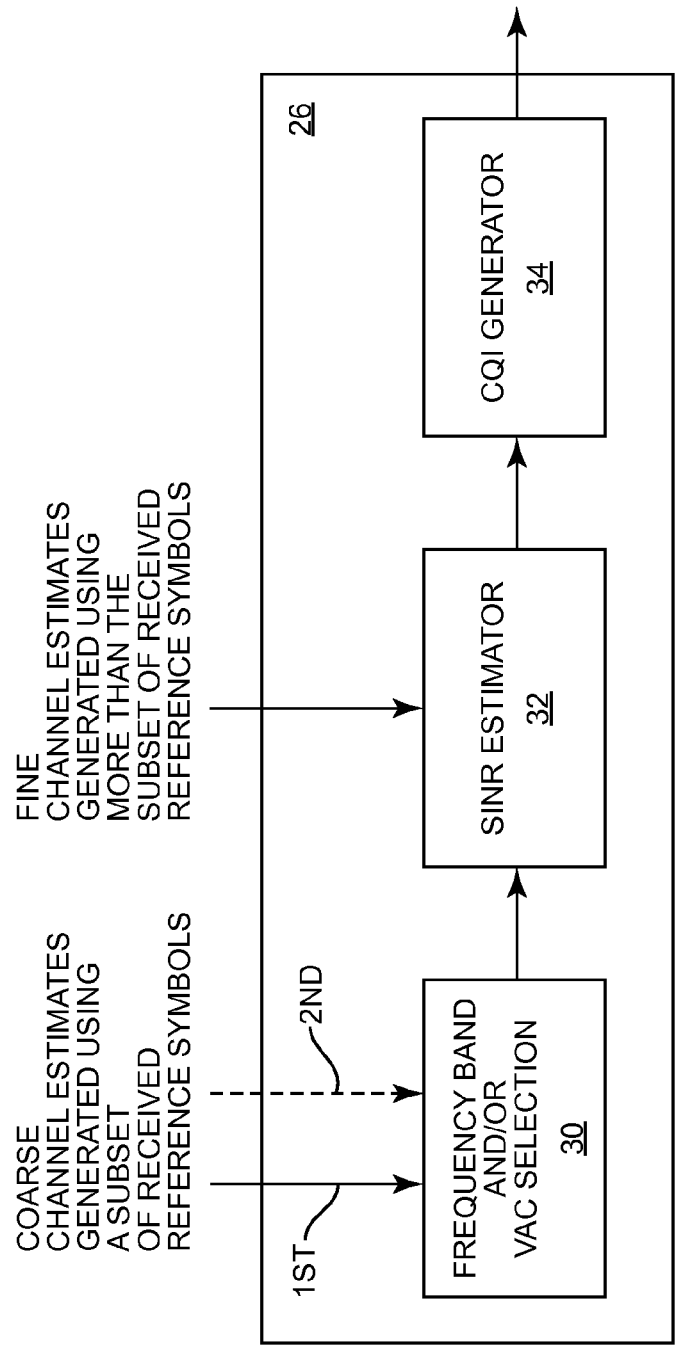
FIG. 3 is a functional block diagram of a CQI estimator in the UE of FIG. 2.

FIG. 3 depicts the SINR function 26 in greater detail. The frequency band and/or VAC selection function 30 receives, from the channel estimator 25, one or more coarse channel estimates generated using subsets of the received reference symbols. In particular, the first and second coarse channel estimates may each be based on as little as a single reference symbol in each of a few resource blocks. These coarse channel estimates are used to select from among a plurality of potential transmission frequency bands and/or VACs. The VAC selection, for example, may be very coarse—one selected VAC over the entire selected frequency band. Because the VAC granularity is the limiting factor, calculating channel estimates over more samples of reference symbols does not yield any more accurate VAC selection. Frequency band selection may be a similarly coarse procedure. In general, the frequency band selection and VAC selection may be performed using the same, or different, coarse channel estimates (that is, channel estimates generated from the same, or different, subsets of the received reference symbols).

Once the frequency bands and/or VAC are selected, a SINR estimator function 32 considers fine channel estimates generated using more than the subset(s) of reference symbols to generate a high fidelity SINR for the selected frequency band and VAC. This SINR is provided, in a UE receiver, to a CQI generator function 34, which estimates a CQI to feed back to the base station for link adaptation. In the case of a base station receiver, the CQI generator block may be omitted, and the SINR is used to directly estimate uplink channel quality.

Figure 4:
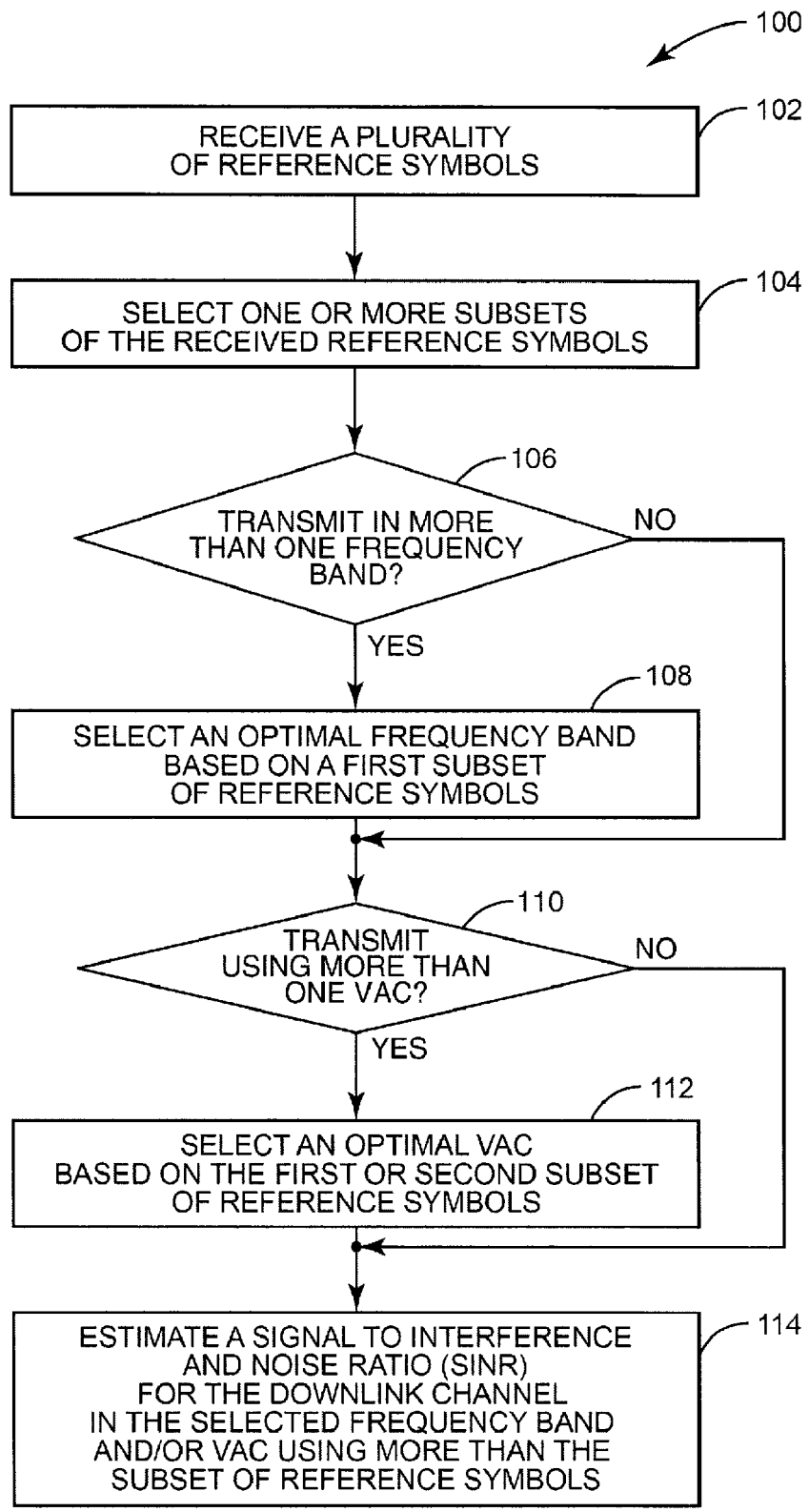
FIG. 4 is a flow diagram of a method of estimating channel quality in the UE of FIG. 2.

FIG. 4 depicts a method 100 of estimating channel quality. The UE 12 receives a plurality of reference symbols (block 102). One or more subsets of the received reference symbols are selected (block 104), such as one or more reference symbol (per subset) in each of one or more resource blocks. If a transmitter is operative to transmit signals in more than one frequency band (block 106), then the UE 12 selects frequency bands based on a first subset of received reference symbols (block 108). Similarly, if the transmitter is operative to transmit signals using more than one VAC (block 110), then the UE 12 selects a VAC based on the first, or a second, subset of received reference symbols (block 112). The UE 12 then generates a SINR for the downlink channel in the selected frequency bands and/or VAC using more received reference symbols than those in the first or second subsets (block 114). Where the downlink channel quality is being monitored, a CQI estimate is then generated based on the SINR, and transmitted to the base station for link adaptation. The CQI estimate may, for example, comprise the selection of a particular modulation and coding scheme for the selected frequency bands and VAC.

Figure 5:
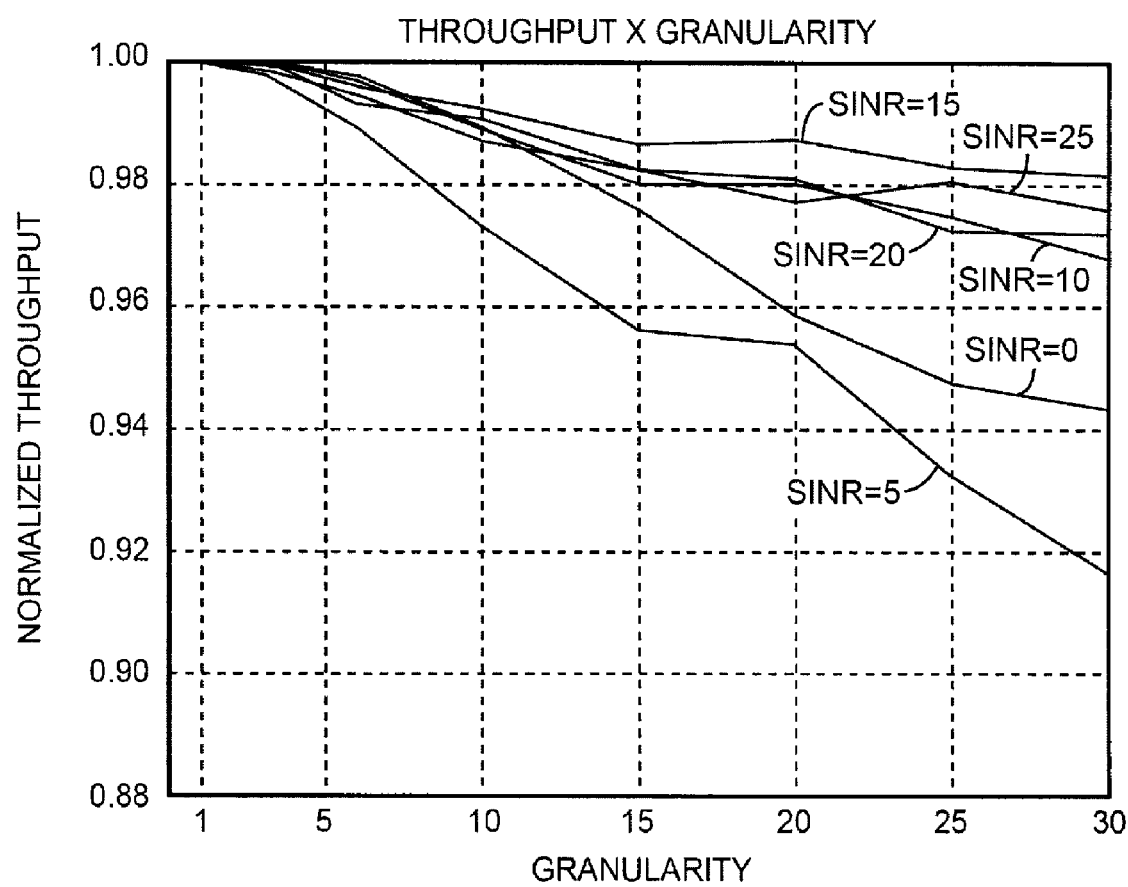
FIG. 5 is a graph of throughput precious granularity of reference symbol selection for a plurality of signals.

By selecting transmission frequency bands and/or VAC using one or more subsets of received reference symbols, and subsequently calculating a SINR for the selected frequency bands/VAC using more than the subset(s) of received reference symbols, the UE 12 reduces the computational complexity of the SINR generation (and hence the CQI estimation) task, and possibly conserves battery power and computational resources, with little degradation in throughput resulting from the reduced-accuracy frequency band/VAC selection. FIG. 5 graphs simulated throughput loss as a function of reference symbol granularity when disregarding information in the frequency band and VAC selection process. The granularity scale indicates the number of reference symbols from which one is selected for frequency band/VAC selection—for example, a granularity of 15 means that one of fifteen reference symbols were considered in the initial selection process. As FIG. 5 depicts, for signals with SINR of 10 dB or greater, 97% throughput is retained when up to only one in thirty reference symbols are considered in the frequency band/VAC selection; even signals with SINR of zero dB retained 97% up to a granularity of one in ten.

While the present invention has been described herein primarily with reference to a UE receiving signals transmitted by a base station, and estimating the quality of the downlink channel, those of skill in the art will readily recognize that the inventive technique may be applied at a base station receiver, to efficiently estimate the quality of the uplink channel.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of estimating channel quality in a receiver having one or more receive antennas and operative in a wireless communications system in which data and reference symbols are transmitted from one or more transmit antennas, comprising:
   receiving a plurality of reference symbols;
   selecting one or more subsets of the received reference symbols;
   determining whether a transmitter may transmit in one or more of two or more frequency bands, and if so, selecting an optimal set of frequency bands based on a first subset of reference symbols;
   determining whether the transmitter may transmit using one of two or more Virtual Antenna Combinations (VAC), and if so, selecting an optimal VAC based on the first or a second subset of reference symbols; and
   estimating a signal to interference and noise ratio (SINR) for the transmission channel in the selected frequency bands and/or VAC using more than the first subset of reference symbols.

2. The method of claim 1 further comprising generating a Channel Quality Indicator (CQI) based on the SINR.

3. The method of claim 2 wherein generating a CQI comprises selecting a preferred Modulation and Coding Scheme (MCS).

4. The method of claim 2 further comprising transmitting the CQI to a base station receiver.

5. The method of claim 1 wherein the method steps are performed in a User Equipment and the channel estimated is the downlink channel.

6. The method of claim 1 wherein the method steps are performed in a base station and the channel estimated is the uplink channel.

7. A transceiver operative in a wireless communication network that transmits data from one or more transmit antennas, comprising:
   at least one receive antenna;
   a receiver front end receiving a plurality of reference symbols from the transmit antennas;
   a channel estimator operative to generate a coarse estimate of the channel response from each transmit antenna to each receive antenna using a subset of the received reference symbols, and further operative to generate a fine estimate of the channel response from each transmit antenna to each receive antenna using more than the subset of received reference symbols; and a SINR generator receiving the coarse and fine channel response estimates, and operative to select frequency bands and/or a VAC based on the coarse channel response estimate, and further operative to generate a signal to interference and noise ratio (SINR) based on the selected frequency bands and/or VAC and the fine channel response estimate.

8. The transceiver of claim 7 wherein the channel estimator is operative to generate first and second coarse estimates of the channel response from each transmit antenna to each receive antenna using different subsets of the received reference symbols; and the SINR generator receives both first and second coarse channel response estimates, and is operative to select frequency bands based on the first coarse channel response estimate and to select a VAC based on the second coarse channel response estimate.

9. The transceiver of claim 7 wherein the SINR generator is further operative to map the SINR to a CQI.

10. The transceiver of claim 9 wherein the SINR generator is further operative to map the SINR to a CQI by selecting a Modulation and Coding Scheme (MCS) based on the SINR.

11. The transceiver of claim 7 wherein the transceiver is located in a User Equipment and the channel estimated is the downlink channel.

12. The transceiver of claim 7 wherein the transceiver is located in a base station and the channel estimated is the uplink channel.

\* \* \* \* \*